United States Patent [19]

Cassutt et al.

[11] 4,260,700

[45] Apr. 7, 1981

[54] UNDERWATER CURING OF EPOXY RESIN AND AMINE-TERMINATED LIQUID POLYMER AND PRODUCT THEREOF

[75] Inventors: Thomas R. Cassutt, Copley; James W. Messerly, Stow; Ronald L. Senderling, Cuyahoga Falls, all of Ohio

[73] Assignee: The B.F. Goodrich Company, Akron, Ohio

[21] Appl. No.: 761,562

[22] Filed: Jan. 24, 1977

Related U.S. Application Data

[63] Continuation-in-part of Ser. No. 749,853, Dec. 13, 1976, abandoned, which is a continuation-in-part of Ser. No. 618,632, Oct. 1, 1975, abandoned.

[51] Int. Cl.$^3$ .............................................. C08L 63/00
[52] U.S. Cl. ................................. 525/113; 260/237 N
[58] Field of Search ............... 260/836, 837 R, 23 EP, 260/23.7 N, 47 EN; 525/113

[56] References Cited

U.S. PATENT DOCUMENTS

| | | | |
|---|---|---|---|
| 3,159,499 | 12/1964 | Jorda | 260/831 |
| 3,673,275 | 6/1972 | Simms | 260/837 R |
| 3,707,583 | 12/1972 | McKown | 260/837 |
| 3,823,107 | 7/1974 | Cotton | 260/23.7 N |
| 3,894,112 | 7/1975 | Pagel | 260/836 |
| 3,919,142 | 11/1975 | Asai | 260/47 EN |
| 3,926,903 | 12/1975 | Scola | 260/42.28 |
| 3,926,904 | 12/1975 | Scola | 260/42.28 |
| 4,018,847 | 4/1977 | Messerly | 260/836 |
| 4,025,578 | 5/1977 | Siebert | 260/836 |

FOREIGN PATENT DOCUMENTS 1815632  7/1969  Fed. Rep. of Germany ........... 260/836

OTHER PUBLICATIONS

R. S. Drake et al., *Rubber World,* Oct. 1968, pp. 51–56.

*Primary Examiner*—Lorenzo B. Hayes
*Assistant Examiner*—Amelia B. Yarbrough
*Attorney, Agent, or Firm*—J. Hughes Powell, Jr.; Charles A. Crehore

[57] ABSTRACT

A mixture of an amine-terminated liquid polymer and a non-cycloaliphatic epoxy resin cures rapidly at ambient temperatures under water while displacing water from substrate surfaces and bonding strongly thereto. The mixture comprises (A) 1 equivalent of at least one non-cycloaliphatic epoxy resin, (B) from about 0.01 to about 1.5 equivalents of at least one amine-terminated liquid polymer having a carbon-carbon backbone, (C) optionally, a chain extender or crosslinker, (D) optionally, a curing agent, and (E) optionally, other compounding ingredients. The mixture is useful as an underwater repair putty, adhesive, coating or the like.

9 Claims, No Drawings

UNDERWATER CURING OF EPOXY RESIN AND AMINE-TERMINATED LIQUID POLYMER AND PRODUCT THEREOF

CROSS REFERENCE TO RELATED APPLICATIONS

This is a continuation-in-part of our co-pending U.S. patent application Ser. No. 749,853, filed Dec. 13, 1976, now abandoned which in turn is a continuation-in-part of our U.S. patent application Ser. No. 618,632, filed Oct. 1, 1975, now abandoned.

BACKGROUND OF THE INVENTION

Underwater-curing coatings are known in the art (Drisko, *Paint and Varnish Production*, Vol. 58, p. 31, July, 1968). Such coatings typically comprise an amine-terminated polyamide resin and a liquid epoxy resin. These prior art coatings may cure rather slowly and may have mediocre adhesive strength and flexibility. New underwater-curing compositions are desired having improved cure rate, adhesive strength and flexibility.

SUMMARY OF THE INVENTION

A mixture of an amine-terminated liquid polymer and a non-cycloaliphatic epoxy resin is applied to a surface and cured under water. The mixture comprises (A) 1 equivalent of at least one non-cycloaliphatic epoxy resin, and (B) from about 0.01 to about 1.5 equivalents of at least one amine-terminated liquid polymer having a carbon-carbon backbone.

DETAILED DESCRIPTION

Amine-Terminated Liquid Polymers

The amine-terminated liquid polymers suitable as component (B) in the compositions of this invention have the formula

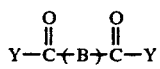

wherein Y is a univalent radical obtained by removing a hydrogen from an amine group of an aliphatic, alicyclic or heterocyclic amine containing at least two primary and/or secondary amine groups, and B is a polymeric backbone comprising carbon-carbon linkages. Generally the carbon-carbon linkages comprise at least about 95% by weight of total polymeric backbone weight, more preferably about 100% by weight of total polymeric backbone weight. The amine-terminated polymers contain an average from about 1.5 to about 4 primary and/or secondary amine groups per molecule, more preferably from about 1.7 to about 3 primary and/or secondary amine groups per molecule. The amine-terminated polymers may have Brookfield viscosities (measured using a Brookfield RVT viscometer at 27° C.) from about 500 cps to about 2,500,000 cps, more preferably from about 500 cps to about 1,200,000 cps. The amine-terminated liquid polymers may have amine equivalent weights (gram molecular weight per primary and/or secondary amine group, but exclusive of tertiary amine groups) from about 300 to about 4,000, more preferably from about 600 to about 3,000.

The amine-terminated liquid polymers can be prepared easily by reacting a carboxyl-terminated, ester-terminated or acid chloride-terminated liquid polymer having a carbon-carbon backbone with at least one aliphatic, alicyclic or heterocyclic amine containing at least two primary and/or secondary amine groups.

The carboxyl-terminated liquid polymers used may have Brookfield viscosities from about 500 cps. to about 2,500,000 cps., more preferably from about 500 cps. to about 1,200,000 cps., and have polymeric backbones comprising carbon-carbon linkages. The carboxyl-terminated liquid polymers may have carboxyl equivalent weight (gram molecular weight per carboxyl group) from about 300 to about 4,000, more preferably from about 600 to about 3,000. The carboxyl functional groups are located at least at the ends of a polymer molecule, but there may also be additional group(s) located pendant to a polymer backbone. The average number of total carboxyl groups typically may be from about 1.5 to about 4 groups per molecule, more preferably from about 1.7 to 3 groups per molecule.

Carboxyl-terminated liquid polymers having carbon-carbon backbone linkages may contain polymerized units of at least one vinylidene monomer having at least one terminal $CH_2=<$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 atoms such as vinyl methyl ether, allyl methyl ether, and the like; and (e) acrylic acids and acrylates having the formula

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 2 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Often two or more types of these polymerized monomeric units are contained in the polymeric backbone.

More preferred liquid polymers contain polymerized units of at least one vinylidene monomer having at least one terminal $CH_2=C<$ group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 3 carbon atoms. Excellent results were obtained with dienes containing 4 to 10 carbon atoms, more preferably 4 to 8 carbon atoms.

The vinylidene monomers described above may be polymerized readily with from 0% up to about 50% by weight, 50% by weight, more preferably from 0% up to about 35% by weight, of at least one comonomer selected from the group consisting of (f) vinyl aromatics having the formula

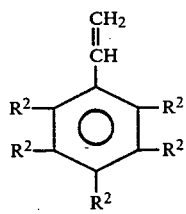

wherein $R^2$ is hydrogen, halogen or an alkyl radical containing from 1 to 4 carbon atoms, such as styrene, α-methyl styrene, chlorostyrene, vinyl toluene, and the like; (g) vinyl nitriles having the formula

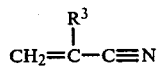

wherein $R^3$ is hydrogen or an alkyl radical containing 1 to 3 carbon atoms, such as acrylonitrile, methacrylonitrile and the like; (h) divinyls and diacrylates such as divinyl benzene, divinyl ether, diethylene glycol diacrylate, and the like; (i) amides of α,β-olefinically unsaturated carboxylic acids containing 2 to 8 carbon atoms such as acrylamide and the like; and (j) allyl alcohol and the like. Liquid polymer compositions comprising polymerized units of a major amount of at least one vinylidene monomer listed in (a) to (e) with a minor amount of at least one comonomer listed in (f) to (j) are within the scope of this invention.

More preferred comonomers may be selected from the group consisting of (f) vinyl aromatics having the formula

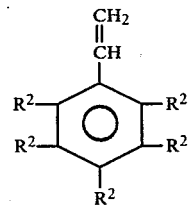

wherein $R^2$ is selected from the group consisting of hydrogen and alkyl radicals containing 1 to 4 carbon atoms; and (g) vinyl nitriles having the formula

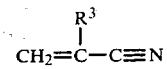

wherein $R^3$ is hydrogen or an alkyl radical containing 1 to 3 carbon atoms. Excellent results were obtained using styrene and acrylonitrile.

Examples of useful liquid polymeric backbones comprising carbon-carbon linkages include polyethylene, polyisobutylene, polyisoprene, polybutadiene, poly(vinyl ethyl ether), poly(ethylacrylate) and poly(butylacrylate) as well as copolymers of butadiene and acrylonitrile; butadiene and styrene; vinyl acetate and isoprene, vinyl ethyl ether and diallyl ether; vinyl ethyl ether and α-methyl styrene; methyl acrylate and butadiene; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and acrylic acid; ethyl acrylate and acrylamide; ethyl acrylate and allyl alcohol; butyl acrylate, styrene and isoprene; butyl acrylate and styrene; butyl acrylate and acrylonitrile; and the like.

Liquid carboxyl-terminated polymers may be prepared by free-radical polymerization using carboxyl-containing initiators and/or modifiers as disclosed in U.S. Pat. No. 3,285,949 and German Pat. No. 1,150,205 and by solution polymerization using lithium metal or organo-metallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hydroxyl-terminated polymers by reaction with dicarboxylic acids or their anhydrides. Liquid halogen-terminated polymers can be reacted with unsaturated anhydrides in the presence of Lewis acids to yield carboxyl groups. Thus, it is seen that the method of preparing the liquid carboxyl-terminated polymer is not critical to the invention. The essential features of the polymer are that it have at least terminal carboxyl groups and a polymeric backbone of carbon-carbon linkages.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethylacrylate), as well as carboxyl-terminated copolymers of butadiene and acrylonitrile and of butadiene and styrene. Carboxyl-terminated copolymers of butadiene with acrylonitrile or styrene were found to be especially useful. These polymers may contain from about 50% to about 99% by weight of butadiene, from about 0% to about 40% by weight of acrylonitrile or styrene and from about 1% to about 15% by weight of carboxyl, based upon the total weight of polymer.

The carboxyl-terminated liquid polymers can be esterified with an aliphatic monohydric alcohol by methods well known to the art in order to produce ester-terminated liquid polymers. For example, a carboxyl-terminated polymer and an aliphatic monohydric alcohol can be reacted under reflux in the presence of a small amount of an acid catalyst. Suitable acid catalysts include organic acids such as monoesters and diesters of orthophosphoric acid, alkarylsulfonic acids such as p-toluenesulfonic acid, and the like; inorganic acids such as boric acid, hydrochloric acid, phosphoric acid, sulfuric acid and the like; and Lewis acids such as tetraisopropyl titanate and the like. The amount of acid catalyst used may be as little as about 0.01% up to about 5% by weight based upon total reactant weight. Suitable aliphatic monohydric alcohols for use in the esterification reaction contain from 1 to about 12 carbon atoms, more preferably from 1 to 6 carbon atoms, and have boiling points below about 150° C., more preferably below about 100° C. Primary aliphatic monohydric alcohols are preferred. Examples of suitable aliphatic monohydric alcohols include alkanols containing from 1 to 6 carbon atoms, such as methanol, ethanol, 1-propanol, 1-butanol, 1-pentanol, and the like. Other suitable aliphatic monohydric alcohols include 2-methoxyethanol, 2-ethoxyethanol and the like. Excellent results may be obtained using ethanol, 1-propanol or 1-butanol. Excellent results may also be obtained using methanolic or ethanolic diazomethane.

The carboxyl-terminated liquid polymers can be converted to acid chloride-terminated liquid polymers by methods well known to the art. For example, a carboxyl-terminated polymer can be reacted with thionyl chloride to produce an acid chloride-terminated polymer. HCl and $SO_2$ are evolved primarily as gases and are separated easily from the acid chloride-terminated polymer, and any excess thionyl chloride can be removed easily by vacuum distillation or by washing with a solvent such as dry methyl ethyl ketone or benzene. Other suitable but less preferred acylation agents include phosphorus trichloride and phosphorus pentachloride.

Amines which react well with the carboxyl-terminated, ester-terminated and acid chloride-terminated polymers described heretofore include aliphatic amines containing from 1 to 20 carbon atoms, more preferably from 1 to 12 carbon atoms, and at least two, more preferably two, primary and/or secondary amine groups. Also suitable are alicyclic amines containing from 4 to 20 carbon atoms, more preferably about 4 to 12 carbon atoms, and at least two, more preferably two, primary and/or secondary amine groups. Heterocyclic amines may also be used which contain from 2 to 20 carbon atoms, more preferably from 2 to 12 carbon atoms, and at least two, more preferably two, primary and/or secondary amine groups. Examples of suitable amines just described include aliphatic amines such as ethylenediamine, 1,2-propanediamine, 1,4-butanediamine, N-methyl-1,3-propanediamine, 1,5-pentanediamine, 1,6-hexanediamine, 1,7-heptanediamine, 1,8-octanediamine, 1,10-decanediamine, 1,12-dodecanediamine and the like; aliphatic polyamines such as diethylenetriamine, triethylenetetramine, tetraethylenepentamine, bis(hexamethylene) triamine, 3,3'-iminobispropylamine, and the like; alicyclic diamines and polyamines such as 1,2-diaminocyclohexane, 1,8-methanediamine and the like; and heterocyclic diamines and polyamines such as 4,4'-trimethylenedipiperidine; 4-(aminomethyl)piperidine; piperazine; N-(aminoalkyl)piperazines wherein each alkyl group contains from 1 to 12 carbon atoms, more preferably 1 to 6 carbon atoms, such as N-(2-aminoethyl)piperazine, N-(3-aminopropyl)piperazine, N,N'-bis(aminopropyl)piperazine, and the like.

More preferably the amines just described contain at least one primary amine group and at least one secondary amine group, even more preferably one primary and one secondary amine group. Primary and secondary amine groups have different reactivities with a given carboxyl-terminated, ester-terminated or acid chloride-terminated liquid polymer described heretofore. Therefore, the presence of such amine groups having different reactivities makes the amine-termination reaction more likely than coupling of the liquid polymers by the diamine, and a smaller amine excess may be used than would otherwise be needed in order to avoid coupling. Examples of more preferred amines include some aliphatic amines such as N-methyl-1,3-propanediamine and the like; and some heterocyclic amines such as 4-(aminomethyl)piperidine and N-(aminoalkyl)piperazines wherein the alkyl group contains from 1 to 12 carbon atoms, more preferably 1 to 6 carbon atoms, such as N-(2-aminoethyl)piperazine, N-(3-aminopropyl)piperazine, and the like. Excellent results were obtained using N-methyl-1,3-propanediamine, 4-(aminomethyl)piperidine and N-(2-aminoethyl)piperazine.

Although aromatic diamines and polyamines can be used to prepare amine-terminated liquid polymers, the liquid polymers are less reactive in the underwater curing process of this invention.

A solvent is not required for the amine-termination reaction but may be used. Mixtures of solvents may also be used. Suitable solvents include aliphatic and cycloaliphatic ethers containing from 3 to 10 carbon atoms, more preferably from 3 to 6 carbon atoms, such as tetrahydrofuran, diethylether and the like; and esters containing from 3 to 10 carbon atoms, more preferably from 3 to 6 carbon atoms, such as ethyl acetate, n-butyl acetate, hexyl acetate, benzyl acetate, methyl propionate, ethyl propionate and the like. Also suitable as solvents and more preferred are aromatic compounds having the formula

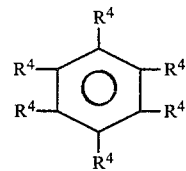

wherein $R^4$ is hydrogen, or an alkyl radical containing 1 to 3 carbon atoms, and at least two $R^4$'s are hydrogen. More preferably $R^4$ is hydrogen, or an alkyl radical containing 1 to 2 carbon atoms, and at least three $R^4$'s are hydrogen. Suitable aromatic solvents include benzene, toluene, o-, m- and p-xylene, o-, m- and p-diethylbenzene, cumene, mesitylene and the like.

A sufficient quantity of at least one amine described heretofore may be reacted with a carboxyl-terminated, ester-terminated or acid chloride-terminated liquid polymer described heretofore in order to produce an amine-terminated liquid polymer containing from about 1.5 to about 4 primary and/or secondary amine groups per molecule. Typically the average number of total carboxyl, ester or acid chloride groups in a liquid polymer before reaction will be from about 1.5 to about 4 groups per molecule, more preferably from about 1.7 to about 3 groups per molecule. In this typical case, from about 1.2 to about 6 moles and more, more preferably from about 1.2 to about 3 moles of at least one amine described heretofore can be used per equivalent of carboxyl-terminated, ester-terminated or acid chloride-terminated liquid polymer described heretofore. However, when the carboxyl-terminated, ester-terminated or acid chloride-terminated liquid polymer also contains polymerized therein appreciable amounts of acrylic acid, acrylates or the like, the amount of amine reacted should be limited so that the amine-terminated liquid polymer contains no more than an average of 1.5 to about 4 primary and/or secondary amine groups per molecule.

No catalyst is required, and many types of mixing apparatus can be used in the amine termination reaction. For example, simple mixers can be used, including turbine stirrers as well as propeller mixers. Reaction components can be combined in any order. The reaction mixture may be heated (or refluxed if a solvent is used) at a temperature from about 80° C. to about 200° C., until more than 90% of carboxyl, ester or acid chloride groups have reacted with the amines, i.e., until the amidation reaction is more than 90% complete. Reaction time is typically about 1 to 120 hours. By-products may be removed by evaporation or the like as they are formed (e.g., water from the carboxylamine reaction, HCl from the acid chloride-amine reaction, and alcohol from the ester-amine reaction). The amine-terminated liquid polymer may be purified by vacuum distillation or by washing with a solvent such as a benzenemethanol mixture in order to remove the unreacted amine, followed by drying the polymer. The structure of amide formed during preparation of the amine-terminated liquid polymers can be determined by infrared spectroscopy. Amine value can be analyzed quantitatively following the procedure described by Siggia, *Quantitative Organic Analysis via Functional Groups*, N.Y., Wiley and Sons, Inc., 1963, pp. 452–456, using a toluene/isopropanol solvent mixture instead of Siggia's ethylene glycol/isopropanol mixture.

UNDERWATER CURING OF NON-CYCLOALIPHATIC EPOXY RESINS AND AMINE-TERMINATED LIQUID POLYMERS

The compositions used in the process of this invention comprise (A) 1 equivalent of at least one noncycloaliphatic epoxy resin described hereinafter and (B) from about 0.01 to about 1.5 equivalents of at least one amine-terminated liquid polymer described heretofore. Compositional properties may be varied widely by using varying amounts of amine-terminated liquid polymer. Chain extenders, crosslinkers, and curing agents described hereinafter may also be used in the epoxy compositions but are not required.

Non-cycloaliphatic epoxy resins suitable for use in this invention together with amine-terminated liquid polymers contain at least an average of about 1.7 epoxy groups per molecule, more preferably from about 1.7 to about 3 epoxy groups per molecule, and even more preferably from about 1.7 to about 2.3 epoxy groups per molecule. The non-cycloaliphatic epoxy resins may be liquids or low-melting solids but are preferably liquids having a bulk viscosity from about 100 centipoises to about 2,000,000 centipoises (measured using a Brookfield RVT viscometer at 25° C.). The epoxy resins can have epoxy equivalent weights (gram molecular weight per epoxy group) from about 70 to about 6,000, more preferably from about 70 to about 2,000. Suitable non-cycloaliphatic epoxy resins include epoxidized cyclic silane, epoxidized soybean oil, polyglycidyl esters of polycarboxylic acids, epoxidized polyolefins, and glycidyl ether resins, with glycidyl ether resins being preferred. Examples of suitable polyglycidyl esters of polycarboxylic acids include the diglycidyl ester of linoleic dimer acid, the triglycidyl ester of linoleic trimer acid, and the like. Suitable glycidyl ether resins include polyallyl glycidyl ether; the diglycidyl ether of chlorendic diol; the diglycidyl ether of dioxanediol; the diglycidyl ether of endomethylene cyclohexanediol; epoxy novolac resins; alkanediol diglycidyl ethers, alkanetriol triglycidyl ethers; and the like.

More preferred glycidyl ether resins include alkanediol diglycidyl ethers having the formula

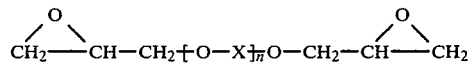

wherein X is an alkylene or alkylidene group containing from 1 to 10 carbon atoms, more preferably from 2 to 6 carbon atoms, and n is from 1 to 25, more preferably from 1 to 15. Suitable alkanediol diglycidyl ethers include ethylene glycol diglycidyl ether, propylene glycol diglycidyl ether, butanediol diglycidyl ether, and the like.

Other more preferred glycidyl ether resins include alkanetriol triglycidyl ethers wherein the alkane group contains from 2 to 10 carbon atoms, more preferably from 3 to 6 carbon atoms, such as glyceryl triglycidyl ether, the triglycidyl ether of trimethylolpropane and the like. Another more preferred class of glycidyl ether resins is the diglycidyl ethers of bisphenols, the bisphenols having the formula

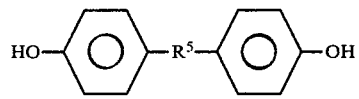

wherein $R^5$ is a bivalent radical containing 1 to 8 atoms of at least one atom selected from the group consisting of C, O, S and N, more preferably an alkylene or alkylidene group containing 1 to 8 carbon atoms, and even more preferably an alkylene or alkylidene group containing 1 to 6 carbon atoms. Examples of suitable bisphenols include methylene bisphenol, isopropylidene bisphenol, butylidene bisphenol, octylidene bisphenol, bisphenol sulfide, bisphenol sulfone, bisphenol ether, bisphenol amine, and the like. Excellent results were obtained using isopropylidene bisphenol (bisphenol A). Examples of suitable diglycidyl ethers of bisphenols include diglycidyl ethers of isopropylidene bisphenol having the formula

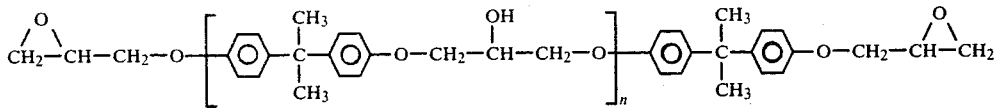

wherein n is from about 0 to about 20, more preferably from about 0 to about 2.

Cycloaliphatic epoxy resins are much less preferred in the process of this invention because they are substantially uncurable at room temperature when mixed with an amine-terminated liquid polymer. By cycloaliphatic epoxy resin in meant a resin in which an epoxy group is itself part of a cycloaliphatic ring structure. Such cycloaliphatic resins include bis(2,3-epoxycyclopentyl) ether, dicyclopentadiene dioxide, the bis(epoxydicyclopentyl) ether of ethylene glycol, 3,4-epoxycyclohexylmethyl-(3,4-epoxy)-cyclohexane carboxylate, bis(3,4-epoxy-6-methylcyclohexylmethyl)adipate and the like. Other cycloaliphatic resins are described in Lee et al, *Handbook of Epoxy Resins*, McGraw-Hill Book Company, N.Y., 1967, Chapter 4.

Other reactive additives are not required in the compositions comprising an amine-terminated liquid polymer and an epoxy resin. However, chain extenders and/or cross-linkers may be used. The amount of chain extender and/or cross-linker used may vary widely depending on relative weights and reactive functionalities of epoxy resins and amine-terminated liquid polymers. The amount of chain extender and/or cross-linker used also depends on properties desired in the compositions of this invention. Typical amounts of chain extender and/or cross-linker used may vary from about 0 to about 60 parts by weight, more preferably from about 0 to about 35 parts by weight per 100 parts by weight of epoxy resin.

Suitable chain extenders and/or cross-linkers can be any of the difunctional and polyfunctional materials known by those skilled in the art to be reactive with epoxy compounds, including dimercaptans such as 1,6-hexanedithiol, 1,8-octanedithiol and the like. Also suitable as chain extenders and di- and polyamines described in detail heretofore in connection with preparation of the amine-terminated liquid polymer and including ethylenediamine; N-(2-aminoethyl)piperazine; the diamine made by reacting a fatty acid dimer (such as linoleic acid dimer) with a diamine; and the like.

Also suitable as chain extenders and/or cross-linkers and more preferred in this invention are dihydric aromatic compounds containing from 6 to 24 carbon atoms, more preferably from 6 to 18 carbon atoms. Suitable dihydric aromatic compounds include catechol, resorcinol, 3-hydroxybenzyl alcohol, 4-hydroxybenzyl alcohol, 1,3-dihydroxynaphthalene, 1,5-dihydroxynaphthalene, 1,7-dihydroxynaphthalene, and, even more preferably, bisphenols having the formula

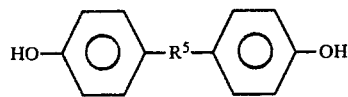

wherein $R^5$ is a bivalent radical containing 1 to 8 atoms of C, O, S and/or N, more preferably an alkylene or alkylidene group containing 1 to 8 carbon atoms, and even more preferably an alkylene or alkylidene group containing 1 to 6 carbon atoms. Examples of suitable bisphenols include methylene bisphenol, isopropylidene bisphenol, butylidene bisphenol, octylidene bisphenol, bisphenol sulfide, bisphenol sulfone, bisphenol ether, bisphenol amine, and the like. Excellent results were obtained using isopropylidene bisphenol (bisphenol A).

Curing agents may be used to accelerate and/or supplement the reaction between the epoxy resin and amine-terminated liquid polymer described heretofore but are not required. Suitable curing agents include imidazoles such as 2-ethyl-4-methyl-imidazole, triethylenetetramine, and the like.

In addition to the two essential components (an amine-terminated liquid polymer and an epoxy resin) and the two optional components (a chain extender or a curing agent) described heretofore, the compositions may contain a broad range of other compounding ingredients. These ingredients are typical ingredients used in rubber and/or epoxy compounding. Standard levels of these ingredients are used, such levels being well known in the art. For example, reinforcing fillers and other ingredients which thicken the liquid compositions may be used at levels up to about 250 parts by weight and more at room temperature based upon 100 parts by weight of the mixture of epoxy resin and amine-terminated liquid polymer.

Examples of compounding ingredients include reinforcing fillers such as carbon blacks, metal carbonates and silicates, and glass, asbestos, and textile fibers; non-reinforcing fillers such as titanium dioxide, silica and the like; colorants such as metal oxides and metal sulfides, and organic colorants; lubricants and plasticizers such as petroleum oils, castor oil, glycerin, silicones, aromatic and paraffinic oils, and alkyl and aromatic phthalates, sebacates, trimellitates, and the like; and antioxidants and stabilizers such as phenyl-$\beta$-naphthylamine, 2,6-di-t-butyl paracresol, 2,2'-methylenebis-(4-ethyl-6-t-butyl phenol), 2,2'-thiobis-(4-methyl-6-t-butyl phenol), 4,4'-butylidenebis-(6-t-butyl-m-cresol), tris-(3,5-di-t-butyl-4-hydroxybenzyl) isocyanurate, hexahydro-1,3,5-tris-$\beta$-(3,5-di-t-butyl-4-hydroxyphenyl)propionyl triazine, tetrakis-methylene-3(3',5'-di-t-butyl-4'-hydroxyphenyl)propionate methane, distearyl thiodipropionate, tri(nonylated phenyl) phosphite, and the like. Wetting agents such as blown fish oil and the like can also be used. Other suitable compounding ingredients include anti-fouling toxic agents such as bis(tri-n-butyltin)oxide described in U.S. Pat. No. 3,426,473.

The epoxy resin compositions usable in the process of this invention comprise (A) 1 equivalent of at least one non-cycloaliphatic epoxy resin described heretofore, (B) from about 0.01 to about 1.5 equivalents, more preferably from about 0.05 to about 1.2 equivalents, of at least one amine-terminated liquid polymer described heretofore, (C) optionally, a chain extender and/or cross-linker, (D) optionally, a curing agent and (E) optionally, other compounding ingredients described heretofore. The composition components can be mixed using mixing kettles, Henschel mixers, ink mills, Banbury mixers, or the like. Standard mixing techniques can be used. A curing agent, if used, is preferably mixed first with the amine-terminated liquid polymer. Pot life of the underwater-curing compositions after mixing typically is from about 2 hours to about 4 hours. Heating the mixture up to about 100° C. may be helpful to obtain dissolution and uniform dispersion of the materials, but such heating causes the compositions to cure much more rapidly.

A wide variety of surface materials may be coated, puttied, patched or the like using the underwater-curing materials described heretofore. Such materials include natural rubber, cis-polyisoprene, cis-polybutadiene (CB), acrylonitrile-butadiene-styrene copolymers (ABS), butadiene-acrylonitrile rubbers (NBR), isoprene-acrylonitrile rubbers, butadiene-styrene rubbers (SBR), isoprene-styrene copolymers, polychloroprene and the like. Other suitable surface materials include isoprene-isobutylene (butyl) rubbers, copolymers of conjugated dienes with lower alkyl and alkoxy acrylates, ethylene-propylene-diene polymers (EPDM), polyurethanes such as those described in Schollenberger U.S. Pat. Nos. 2,871,218 and 2,899,411, and the like. Still other suitable surface materials include wood, concrete, stainless steel, glass, ceramic tile, tin, and antifouling coverings such as those described in U.S. Pat. No. 3,426,473, incorporated herein by reference.

Underwater surfaces or substrates to be contacted with the compositions described heretofore are preferably cleaned prior to contacting in order to promote adhesion of the compositions to the surfaces or substrates. Rust, fouling, oil and other contaminants should be removed as completely as possible. Cleaning methods known to the art may be used, such as sandblasting, wire brushing, water blasting, hand buffing and the like. When patching a damaged coating area, it is advisable to clean the fouled surface about 0.5 to 1 inch beyond the spot to be patched and to coat the latter area as well. This precaution insures good bonding at the overlap area of the patch.

Application methods well known to the art may be used. For example, more viscous compositions can be picked up with wet hands or gloves and applied manually to a cleaned substrate. A ball of the composition may be pressed firmly by hand against the substrate and forced slowly from the center to the outer edges in order to displace water and give a coating thickness of about ⅛ to ¼ inch. Thereafter the coating may be smoothed and feathered at its edges. Alternatively, the underwater-curable compositions of this invention may be applied by brushing or roling using a pressure feed system. Yet another application method involves use of an inverted cofferdam fitted tightly against the structure to be coated. Water is displaced by pumping air in order to produce an air pocket between the cofferdam and the surface to be coated, which is coated while damp. The cofferdam can be removed immediately after coating or left in place until compositional curing is complete.

Adhesive and coating thicknesses of the underwater-curing compositions described heretofore may vary widely but are typically from about 0.001 inch to about 0.25 inch and more, preferably from about 0.005 inch to about 0.1 inch. When used as a repair putty, thickness may vary widely up to several inches if the compositions are used to fill cracks, holes or the like. The compositions may cure at temperatures from about 28° F. to about 100° F. and more, with cure time decreasing as temperature increases. Underwater cure time generally may range from about 1 hour to about 20 hours, more typically from about 3 hours to 12 hours.

The compositions described heretofore can be applied to dry, wet or water-submerged surfaces and cured while dry, wet or under water. By a wet surface is meant one containing, covered with or soaked with water. It was both surprising and unexpected to find that the compositions cured rapidly while displacing water on wet or underwater surfaces, bonding strongly thereto and developing excellent adhesive strength and flexibility. Water is believed to react to some extent with the compositions described heretofore and to act as an accelerator.

The following examples illustrate the present invention more fully.

EXAMPLES 1–14

The following examples 1–14 demonstrate preparation of amine-terminated liquid polymers from carboxyl-terminated butadiene-acrylonitrile, butadiene-styrene or butadiene-acrylonitrile-acrylic acid liquid polymers. The carboxyl-terminated liquid polymers were prepared according to the method of U.S. Pat. No. 3,285,949. The amount of N-(2-aminoethyl)piperazine required to react with a given amount of a carboxyl-terminated liquid polymer was calculated using the formula:

$$\frac{(\text{Ephr}_{COOH}) \times (\text{Mol. Wt.}_{AEP}) \times \left(\frac{AEP}{CTP} \text{ Ratio}\right) \times (\text{Wt.}_{CTP})}{100}$$

where $\text{Ephr}_{COOH}$ = carboxyl equivalent weight per hundred weight parts of carboxyl-terminated liquid polymer;

$\text{Mol. Wt.}_{AEP}$ = molecular weight of N-(2-aminoethyl)piperazine, i.e. 129;

$\frac{AEP}{CTP}$ Ratio = desired ratio of moles of N-(2-aminoethyl)piperazine (AEP) to equivalents of carboxyl-terminated liquid polymer (CTP); and $\text{Wt.}_{CTP}$ = weight in grams of carboxyl-terminated liquid polymer (CTP).

In each example 1–14 a 2-liter, 4-necked glass flask was cleaned thoroughly with soap and water, rinsed first with water and then with acetone, and flushed with nitrogen until dry. The flask was equipped with an air stirrer, thermocouple, nitrogen inlet tube, and Dean-Stark water trap with water condenser. A carboxyl-terminated liquid polymer and N-(2-aminoethyl)piperazine were charged to the flask with stirring, and the reaction mixture was heated to about 120° C. to 130° C. using an oil bath. The flask was purged continuously with nitrogen during reaction. After final $\text{Ephr}_{COOH}$ of the reaction mixture was reduced to less than 10% of the initial $\text{Ephr}_{COOH}$, the gas inlet tube was replaced by a stopper, and the water condenser was connected to a vacuum pump. A vacuum (about 1 to 2 mm hg) was drawn on the flask and maintained for about 2 hours in order to remove some excess N-(2-aminoethyl)piperazine and other volatiles. Brookfield viscosity in each example was measured at 27° C. using a Brookfield RVT viscometer and #4 spindle. Data is set forth in Table I.

TABLE I

| | Carboxyl-terminated Liquid Polymer | | | | | N-(2-aminoethyl)piperazine | | Amine-Terminated Liquid |
|---|---|---|---|---|---|---|---|---|
| Ex. | Wt. (grams) | Ephr$_{COOH}$+ | Brookfield Viscosity(cps.) | Acrylonitrile (Wt. %) | Styrene (Wt. %) | Wt. (grams) | $\frac{AEP}{CTP}$ Ratio+++ | Polymer-Brookfield Viscosity(cps.) |
| 1 | 1000.4 | 0.044 | 43,000 @ 27° C. | 0 | 0 | 85.2 | 1.5 | 244,000 @ 27° C. |
| 2 | 1000 | 0.044 | 44,200 @ 27° C. | 0 | 0 | 170.3 | 3.0 | 76,500 @ 27° C. |
| 3 | 1000 | 0.047 | 65,400 @ 24° C. | 0 | 0 | 121.3 | 2.0 | 290,000 @ 24° C. |
| 4 | 1000 | 0.047 | 65,600 @ 22° C. | 0 | 0 | 181.4 | 3.0 | 194,000 @ 22° C. |
| 5 | 8250 | 0.043 | 61,200 @ 22° C. | 0 | 0 | 1373 | 3.0 | 187,200 @ 22° C. |
| 6 | 1000 | 0.053 | 75,000 @ 23° C. | 9.9 | 0 | 205.1 | 3.0 | 89,000 @ 23° C. |
| 7 | 940 | 0.053 | 75,000 @ 22° C. | 9.9 | 0 | 192.8 | 3.0 | 130,000 @ 22° C. |
| 8 | 1001.4 | 0.054 | 191,000 @ 23° C. | 18.1 | 0 | 209.3 | 3.0 | 320,000 @ 23° C. |
| 9 | 1000 | 0.052 | 177,000 @ 23° C. | 18.2 | 0 | 201.2 | 3.0 | 187,000 @ 23° C. |
| 10 | 1001.1 | 0.056 | 1,320,000 @ 22° C. | 26.5 | 0 | 108.5 | 1.5 | >2,000,000 @ 22° C. |
| 11 | 1003 | 0.056 | 1,320,000 @ 22° C. | 26.5 | 0 | 217.4 | 3.0 | 1,008,000 @ 32° C. |
| 12 | 1200 | 0.056 | 1,320,000 @ 22° C. | 26.5 | 0 | 260 | 3.0 | 870,000 @ 22° C. |
| 13++ | 1005 | 0.068 | 244,400 @ 22° C. | 17.5 | 0 | 132.2 | 1.5 | 802,000 @ 22° C. |
| 14 | 1000 | 0.05 | 850,000 @ 21° C. | 0 | 20 | 181.9 | 2.8 | >2,000,000 @ 21° C. |

+Carboxyl equivalent weight per hundred weight parts of carboxyl-terminated liquid polymer.
++Carboxyl-terminated terpolymer of butadiene, acrylonitrile and acrylic acid
+++AEP/CTP Ratio = desired ratio of moles of N-(2-aminoethyl) piperazine (AEP) to equivalents of carboxyl-terminated liquid polymer (CTP).

Several amine-terminated liquid polymers were analyzed by infrared spectroscopy. Carboxyl carbonyl bands at 1710 cm$^{-1}$ and 1745 cm$^{-1}$ were completely absent. Amide carbonyl bands were present at 1530 cm$^{-1}$ and 1675 cm$^{-1}$.

A number of amine-terminated liquid polymers like those in Table I were analyzed by potentiometric titration according to the modified Siggia procedure described heretofore. Ephr$_{AMINE}$ may be defined as primary and/or seconday amine equivalent weight (exclusive of tertiary amine content) per hundred weight parts of amine-terminated liquid polymer. The Ephr$_{AMINE}$ ranged from about 0.04 to about 0.2 depending upon residual N-(2-aminoethyl)piperazine content. The infrared spectra and potentiometric titration data, as well as nuclear magnetic resonance spectra, indicated that carboxyl groups of carboxyl-terminated liquid polymers reacted mainly with the primary amine group of N-(2-aminoethyl)piperazine to produce amine-terminated liquid polymers having mainly free secondary amine groups.

EXAMPLE 15

Example 15 demonstrates again the preparation of an amine-terminated liquid polymer from N-(2-aminoethyl)piperazine and a carboxyl-terminated butadieneacrylonitrile liquid polymer. The carboxyl-terminated liquid polymer was prepared according to the method of U.S. Pat. No. 3,285,949 and was found to have a Brookfield viscosity at 27° C. of 106,000 cps., an Ephr$_{COOH}$ of 0.052, a carboxyl equivalent weight of 1923, and an acrylonitrile content of 16.0 wt.%. The amount of N-(2-aminoethyl)-piperazine required to react with a given amount of the carboxyl-terminated liquid polymer was calculated using the formula described for examples 1-14.

A 2-liter, 4-necked glass flask was cleaned thoroughly with soap and water, rinsed first with water and then with acetone, and flushed with nitrogen until dry. The flask was equipped with an air stirrer, thermocouple, nitrogen inlet tube, and Dean-Stark water trap with water condenser.

1000 grams (0.52 equivalent) of the carboxyl-terminated liquid polymer and 134.4 grams (1.04 moles) of N-(2-aminoethyl)piperazine were charged to the flask with stirring, and the reaction mixture was heated to about 130° C. using an oil bath. The flask was purged continuously with nitrogen during reaction. Reaction was continued for 12 hours at 130° C., and subsequently vacuum dried for 7 hours at 1 mm Hg and 130° C.

An amine-terminated liquid polymer was produced having a Brookfield viscosity at 27° C. of 515,000 cps. The liquid polymer was found by potentiometric titration to have undergone 100% conversion and to have an Ephr$_{AMINE}$ of 0.0496, a residual N-(2-aminoethyl)-piperazine content of 0.03 wt.%, and an amine equivalent weight of 2016.

EXAMPLE 16

Example 16 demonstrates preparation of an amine-terminated liquid polymer from N-methyl-1,3-propanediamine and a carboxyl-terminated butadieneacrylonitrile liquid polymer. The carboxyl-terminated liquid polymer was prepared according to the method of U.S. Pat. No. 3,285,949 and was found to have a Brookfield viscosity at 27° C. of 128,000 cps., an Ephr$_{COOH}$ of 0.056, a carboxyl equivalent weight of 1786, and an acrylonitrile content of 16.1 wt.%. The amount of N-methyl-1,3-propanediamine required to react with a given amount of the carboxyl-terminated liquid polymer was calculated using the formula described for examples 1-14, with N-methyl-1,3-propanediamine substituted for N-(2-aminoethyl)piperazine.

A 2-liter, 4-necked glass flask was cleaned thoroughly with soap and water, rinsed first with water and then with acetone, and flushed with nitrogen until dry. The flask was equipped with an air stirrer, thermocouple, nitrogen inlet tube, and Dean-Stark water trap with water condenser.

1000 grams (0.56 equivalent) of the carboxyl-terminated liquid polymer and 99 grams (1.12 moles) of N-methyl-1,3-propanediamine were charged to the flask with stirring, and the reaction mixture was heated to about 130° C. using an oil bath. The flask was purged continuously with nitrogen during reaction. Reaction was continued for 51 hours at 130° C. and 54 hours at 150° C., for a total reaction time of 105 hours.

An amine-terminated liquid polymer was produced having a Brookfield viscosity at 27° C. of 1,000,000 cps. The liquid polymer was found by potentiometric titration to have undergone 100% conversion and to have an Ephr$_{AMINE}$ of 0.0745, a residual N-methyl-1,3-propanediamine content of 0.823 wt.% and an amine equivalent weight of 1340. After vacuum drying, the liquid polymer was found to have an Ephr$_{AMINE}$ equivalent weight of 1776. An infrared spectrum was obtained having broad amide carbonyl bands at 1640–1675 cm$^{-1}$, indicating that primary as well as secondary amine groups of N-methyl-1,3-propanediamine reacted with carboxyl groups of the carboxyl-terminated liquid polymer to produce an amine-terminated liquid polymer.

EXAMPLE 17

Example 17 demonstrates preparation of an amine-terminated liquid polymer from 4,4'-trimethylenedipiperidine and a carboxyl-terminated butadiene-acrylonitrile liquid polymer. The carboxyl-terminated liquid polymer was prepared according to the method of U.S. Pat. No. 3,285,949 and was found to have a Brookfield viscosity at 27° C. of 128,000 cps., an Ephr$_{COOH}$ of 0.056, a carboxyl equivalent weight of 1786, and an acrylonitrile content of 16.1 wt. %. The amount of 4,4'-trimethylenedipiperidine required to react with a given amount of the carboxyl-terminated liquid polymer was calculated using the formula described for examples 1–14, with 4,4'-trimethylenedipiperidine substituted for N-(2-aminoethyl)piperazine.

A 2-liter, 4-necked glass flask was cleaned thoroughly with soap and water, rinsed first with water and then with acetone and flushed with nitrogen until dry. The flask was equipped with an air stirrer, thermocouple, nitrogen inlet tube, and Dean-Stark water trap with water condenser.

1000 grams (0.56 equivalent) of the carboxyl-terminated liquid polymer and 236 grams (1.12 moles) of 4,4'-trimethylenedipiperidine were charged to the flask with stirring, and the reaction mixture was heated to about 130° C. using an oil bath. The flask was purged continuously with nitrogen during reaction. Reaction was continued for 5 hours at 130° C., 19 hours at 140° C., 4 hours at 150° C., 3 hours at 180° C., 16 hours at 150° C., and 8 hours at 180° C., for a total of 55 hours.

An amine-terminated liquid polymer was produced having a Brookfield viscosity at 27° C. of 445,000 cps. The liquid polymer was found by potentiometric titration to have undergone 100% conversion and to have an Ephr$_{AMINE}$ of 0.1245, a residual 4,4'-trimethylenedipiperidine content of 8.55 wt. % and an amine equivalent weight of 803. After vacuum drying, the liquid polymer was found to have an Ephr$_{AMINE}$ of 0.0473 and an amine equivalent weight of 2114. An infrared spectrum was obtained having an amide carbonyl band at 1648 cm$^{-1}$, indicating that secondary amine groups of 4,4'-trimethylenedipiperidine reacted with carboxyl groups of the carboxyl-terminated liquid polymer to produce an amine-terminated liquid polymer.

EXAMPLE 18

Example 18 demonstrates preparation of an amine-terminated liquid polymer from 4-(aminomethyl)piperidine and a carboxyl-terminated butadiene-acrylonitrile liquid polymer. The carboxyl-terminated liquid polymer was prepared according to the method of U.S. Pat. No. 3,285,949 and was found to have a Brookfield viscosity at 27° C. of 128,000 cps., an Ephr$_{COOH}$ of 0.056, a carboxyl equivalent weight of 1786, and an acrylonitrile content of 16.1 wt. %. The amount of 4-(aminomethyl)piperidine required to react with a given amount of the carboxyl-terminated liquid polymer was calculated using the formula described for examples 1–14, with 4-(aminomethyl)piperidine substituted for N-(2-aminoethyl)piperazine.

A 2-liter, 4-necked glass flask was cleaned thoroughly with soap and water, rinsed first with water and then with acetone and flushed with nitrogen until dry. The flask was equipped with an air stirrer, thermocouple, nitrogen inlet tube, and Dean-Stark water trap with water condenser.

1000 grams (0.56 equivalent) of the carboxyl-terminated liquid polymer and 128 grams (1.12 moles) of 4-(aminomethyl)piperidine were charged to the flask with stirring, and the reaction mixture was heated to about 130° C. using an oil bath. The flask was purged continuously with nitrogen during reaction. Reaction was continued for 7 hours at 130° C. and 41 hours at 150° C., for a total of 48 hours.

An amine-terminated liquid polymer was produced having a Brookfield viscosity at 27° C. of 1,000,000 cps. The liquid polymer was found by potentiometric titration to have undergone 99.9% conversion and to have an Ephr$_{AMINE}$ OF 0.1182, a residual 4-(aminomethyl)piperidine content of 3.69 wt. %, and an amine equivalent weight of 850. After vacuum drying, the liquid polymer was found to have an Ephr$_{AMINE}$ of 0.057 and an amine equivalent weight of 1788. An infrared spectrum was obtained having broad amide carbonyl bands at 1640–1675 cm$^{-1}$, indicating that primary as well as secondary amine groups of 4-(aminomethyl)piperidine reacted with carboxyl groups of the carboxyl-terminated liquid polymer to produce an amine-terminated liquid polymer.

EXAMPLES 19–21

General Mixing Procedure and Sample Preparation

The underwater-curing compositions were prepared following a general mixing procedure. A filler (if used) was mixed with an epoxy resin on an ink mill. Additional filler (if used) was mixed with an amine-terminated liquid polymer on an ink mill. The two mixtures were stirred together in a beaker using a spatula, and the final mixture was used within about 2 hours after mixing was complete. The components of System X were mixed by stirring in a beaker at room temperature.

Test samples were prepared as follows. Neoprene rubber compound strips were prepared containing an anti-fouling agent and measuring about 25 mm×200 mm×2.2 mm. Each rubber strip was suspended in a 29-gallon aquarium containing synthetic ocean water and aged for at least 24 hours at 70°–80° F. Each strip was then removed from the tank, buffed lightly and returned immediately to the tank. An underwater-curing composition was applied underwater onto the 25 mm×200 mm surface of a strip. Application was made by hand or using a putty knife. Compositional thickness on the rubber strip was about 0.25 inch. Immediately thereafter, the buffed surface of a second strip was pressed onto the underwater-curing composition while underwater to form a sandwich. The two strips were pressed firmly together in order to eliminate water between them and allowed to cure underwater.

MATERIALS

The amine-terminated liquid polymers used in the following examples were prepared readily using a carboxyl-terminated liquid polymer (prepared by the method of U.S. Pat. No. 3,285,949) and N-(2-aminoethyl)-piperazine in the amine-termination reaction. The amine-terminated liquid polymers, identified as ATBN, were amine-terminated poly(butadiene/acrylonitrile) copolymers having an acrylonitrile content of about 9.5% by weight of polymer, a viscosity at 27° C. of about 90,000 cps. and a molecular weight of about 3,600.

The non-cycloaliphatic epoxy resin most frequently used was a liquid diglycidyl ether of bisphenol A (DGEBA) having an epoxy equivalent weight of about 185 to 192 and a viscosity at 25° C. of about 10,000 to 16,000 cps. The DGEBA resin is sold under the trademark "Epon 828" by Shell Chemical Company. Another non-cycloaliphatic epoxy resin used was the triglycidyl ether of glycerol having an epoxy equivalent weight of about 140 to 160 and a viscosity at 25° C. of about 100 to 170 cps., this resin being sold under the trademark "Epon 812" by Shell Chemical Company. Yet another non-cycloaliphatic epoxy resin used was a liquid diglycidyl ether of bisphenol A (DGEBA) having an epoxy equivalent weight of about 180 to 200 and a viscosity at 25° C. of about 10,000 to 16,000 cps. The latter material is sold under the trademark "Epi-Rez 510" by Celanese Corp.

Polyamide resins used in preparing compositions for comparison with the underwater-curing compositions used in the process of this invention included two materials sold under the trademarks "Versamid 115" and "Versamid 140" by General Mills, Inc. "Versamid 115" is the reaction product of a dimer dibasic acid and a polyamine and has an approximate amine value of 238 and a reactive equivalent weight of about 236. "Versamid 140" is the reaction product of a dimer dibasic acid and a polyamine and has an approximate amine value of 385 and a reactive equivalent weight of about 146. Amine value is defined as the number of milligrams of potassium hydroxide equivalent to the amine alkalinity present in one gram of polyamide resin sample. Reactive equivalent weight is defined as 56,100 (the milligram equivalent weight of potassium hydroxide) divided by the amine value of the polyamide resin sample.

Also used for comparison purposes was a commercially available underwater-curing system sold as a two-part system and identified hereinafter as "System X". Part #1 comprised a liquid diglycidyl ether of bisphenol A (DGEBA), and about 52 wt % of a silica filler. Part #2 comprised a polyamide resin believed to be "Versamid 115", described heretofore, and about 57 wt. % of a silica filler. Both parts were mixed thoroughly by stirring together just before testing.

Except for the amine-terminated liquid polymers described in detail heretofore, the non-cycloaliphatic epoxy resins, polyamide resins and other materials used in the following examples are known commercial materials and are readily available.

Test Methods

Peel adhesion strength was tested using the procedure in ASTM D-903. Flexibility was evaluated by bending up to 360° and by stretching by hand.

Underwater-curing compositions in each of the following examples were prepared following the general mixing and sample preparation procedure described heretofore. Testing was done after about 48 hours exposure to water at 23° C. Test results are summarized in Table II.

TABLE II

| Example | 19 | 20 | 21 |
|---|---|---|---|
| Recipe | | | |
| Epon 828, Wt. Parts (Equivalents) | 100(0.53) | 100(0.53) | — |
| ATBN, Wt. Parts (Equivalents) | 800(0.42) | 800(0.42) | — |
| System X, Part 1, Wt. Parts | — | — | 30 |
| System X, Part 2, Wt. Parts | — | — | 40 |
| Fumed Colloidal Silica, Wt. Parts | 135 | 135 | — |
| N-550 Carbon Black, Wt. Parts | — | 90 | — |
| Test Data | | | |
| Cure time, hours | 8–12 | 8–12 | 24 |
| Average Adhesion Range, lbs/in. | 18–30 | 27–35 | 3–5 |
| Flexibility | Excellent | Excellent | Very Poor |

Samples in examples 19 and 20 cured rapidly and demonstrated superior peel adhesion strength and flexibility without sagging. In clear contrast, the prior art composition of Example 21 cured slowly, and both adhesion and flexibility were very poor.

EXAMPLES 22–26

Underwater curing compositions in each of the following examples were prepared following the general mixing and sample preparation procedure described heretofore. Testing was done after 72 hours exposure to water at 25° C. Test results are summarized in Table III.

TABLE III

| Example | 22 | 23 | 24 | 25 | 26 |
|---|---|---|---|---|---|
| Recipe | | | | | |
| Epon 828, Wt. Parts (Equivalents) | 100 (0.53) | 100 (0.53) | 100 (0.53) | — | — |
| Epi-Rez 510, Wt. Parts (Equivalents) | — | — | — | 100 (0.53) | — |
| ATBN, Wt. Parts (Equivalents) | 500 (0.26) | — | — | — | — |
| System X, Part 1, Wt. Parts | — | — | — | — | 30 |
| System X, Part 2, Wt. Parts | — | — | — | — | 40 |
| Versamid 115, Wt. parts (Equivalents) | — | 100 (0.42) | — | 100 (0.42) | — |
| Versamid 140, Wt. Parts (Equivalents) | — | — | 100 (0.68) | — | — |
| TiO$_2$, Wt. Parts | 250 | 50 | 75 | 50 | — |
| Test Data | | | | | |
| Cure time, Hours | ~3 | ~24 | ~7 | ~24 | ~24 |
| Average Adhesion, lbs./in. | 8–9 | 7–8 | 5–6 | 7–8 | 3–4 |
| Maximum Adhesion, lbs./in. | 12 | 8.5 | 6.5 | 9.5 | 5 |
| Flexibility | Very Good | Fair | Poor | Fair | Very Poor |

The sample in example 22 cured rapidly and demonstrated superior peel adhesion strength and flexibility. In contrast, the prior art compositions of examples 23–26 cured more slowly, demonstrated lower peel adhesion strengths and had only very poor to fair flexibilities.

Compositions described heretofore, comprising at least one non-cycloaliphatic epoxy resin and at least one amine-terminated liquid polymer having a carbon-carbon backbone, cure rapidly and have excellent adhesive strength, with flexibility improving with increasing amount of amine-terminated liquid polymer. The compositions cure underwater in the process of this invention and are useful as underwater repair putties, adhesives, coatings and the like for ship hulls, sonar domes, wooden or concrete piers, and the like.

We claim:

1. A process comprising applying an underwater-curing composition to a dry or wet surface or a surface submerged in water, and thereafter curing the composition on said wet or submerged surface, said composition comprising
    (A) 1 equivalent of at least one non-cycloaliphatic epoxy resin containing at least an average of about 1.7 epoxy groups per molecule, said resin having an epoxy equivalent weight from about 70 to about 6,000, and
    (B) from about 0.01 to about 1.5 equivalents of at least one amine-terminated liquid polymer containing an average from about 1.5 to about 4 amine groups per molecule, said groups being primary, secondary or a mixture thereof, and said polymer having the formula

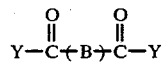

wherein Y is an univalent radical obtained by removing a hydrogen from an amine group of an aliphatic, alicyclic or heterocyclic amine containing from 2 to 20 carbon atoms and at least two amine groups, at least two of said amine groups being primary, secondary or a mixture thereof, and B is a polymeric backbone containing carbon-carbon linkages comprising at least 95% of total polymeric backbone weight, said backbone B containing polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

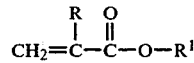

said R being hydrogen or an alkyl radical containing 1 to 3 carbon atoms, and said $R^1$ being hydrogen, an alkyl radical containing 1 to 18 carbon atoms, or an alkoxyalkyl, alkylthioalkyl or cyanoalkyl radical containing 2 to 12 carbon atoms.

2. A process of claim 1 wherein said carboncarbon linkages comprise 100% by weight of total polymeric backbone weight, and said monomer is selected from the group consisting of (a) monoolefins containing 2 to 8 carbon atoms, (b) dienes containing 4 to 8 carbon atoms, and (e) acrylic acids and acrylates having the formula

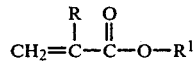

said R being hydrogen or an alkyl radical containing 1 to 3 carbon atoms and said $R^1$ being hydrogen, an alkyl radical containing 1 to 8 carbon atoms, or an alkoxyalkyl, alkylthioalkyl or cyanoalkyl radical containing 2 to 8 carbon atoms.

3. A process of claim 2 wherein said epoxy resin has an epoxy equivalent weight from about 70 to about 2,000.

4. A process of claim 3 wherein said epoxy resin is a glycidyl ether resin.

5. A process of claim 4 wherein said epoxy resin is selected from the group consisting of (1) alkanediol diglycidyl ethers having the formula

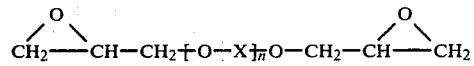

wherein X is an alkylene or alkylidene group containing from 1 to 10 carbon atoms, and n is from 0 to 20, (2) diglycidyl ethers of bisphenols, said bisphenols having the formula

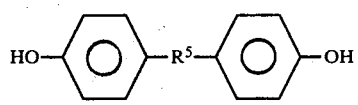

wherein $R^5$ is a bivalent radical containing from 1 to 8 atoms of at least one atom selected from the group consisting of C, O, S and N, and (3) alkanetriol triglycidyl ethers wherein the alkane group contains from 2 to 10 carbon atoms.

6. A process of claim 5 wherein said vinylidene monomer contains copolymerized therewith from 0% up to about 50% by weight of at least one comonomer selected from the group consisting of (f) vinyl aromatics having the formula

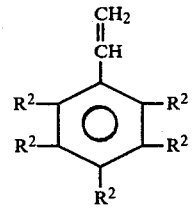

wherein $R^2$ is hydrogen, or an alkyl radical containing from 1 to 4 carbon atoms, (g) vinyl nitriles having the formula

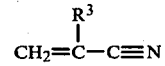

wherein $R^3$ is hydrogen or an alkyl radical containing 1 to 3 carbon atoms, (h) divinyls and diacrylates, (i) amides of $\alpha,\beta$-olefinically unsaturated carboxylic acids containing 2 to 8 carbon atoms, and (j) allyl alcohol.

7. A process of claim 6 wherein said amine contains one primary and one secondary amine group per molecule, and said comonomer is selected from the group consisting of (f) said vinyl aromatics and (g) said vinyl nitriles.

8. A process of claim 7 wherein said epoxy resin is a diglycidyl ether of isopropylidene bisphenol, said amine is at least one N-(aminoalkyl)piperazine, the aminoalkyl group of said amine contains from 1 to 12 carbon atoms, said vinylidene monomer is at least one of said dienes, and said comonomer is at least one of said vinyl nitriles.

9. A process of claim 8 wherein said diene is butadiene, said vinyl nitrile is acrylonitrile, and said amine is N-(2-aminoethyl)piperazine.

* * * * *